United States Patent [19]

Vits

[11] 4,218,001
[45] Aug. 19, 1980

[54] BLOW BOX FOR SUSPENDED GUIDANCE AND/OR CONVEYANCE OF STRIP MATERIAL OR SHEETS

[75] Inventor: Hilmar Vits, Leichlingen, Fed. Rep. of Germany

[73] Assignee: Vits-Maschinenbau GmbH, Langenfeld, Fed. Rep. of Germany

[21] Appl. No.: 972,375

[22] Filed: Dec. 22, 1978

[30] Foreign Application Priority Data

Jan. 21, 1978 [DE] Fed. Rep. of Germany ....... 2802610

[51] Int. Cl.$^2$ .................... F26B 13/20; B65H 17/32
[52] U.S. Cl. ........................................ 226/97; 34/156; 239/556; 239/561
[58] Field of Search ................ 34/155, 156, 160; 226/7, 97; 406/88; 414/676; 239/556, 560, 561

[56] References Cited

U.S. PATENT DOCUMENTS

| 2,848,820 | 8/1958 | Wallin et al. | 34/156 |
| 3,800,438 | 4/1974 | Meier-Windhorst | 34/160 |
| 3,957,187 | 5/1976 | Puigbodon | 34/156 |
| 3,979,038 | 9/1976 | Karlsson | 34/156 |
| 4,021,931 | 5/1977 | Russ et al. | 34/156 |
| 4,074,841 | 2/1978 | Kramer | 34/156 |

FOREIGN PATENT DOCUMENTS 2142450  1/1973  France ..................... 34/156

Primary Examiner—Larry I. Schwartz
Attorney, Agent, or Firm—J. Harold Nissen

[57] ABSTRACT

A blow box for suspended guidance and/or conveyance of strip material or sheets in which the blow means is blown with the effect of a blow jet issuing from a slot nozzle at an incline against the strips or sheets to be guided and/or conveyed. The blow box includes a barrier wall provided with blast openings which are arranged therein facing the strips or sheets so as to be close to one another in a row and have blowing directions which are substantially the same or which slightly diverge towards the ends of the blow box. Each blast opening is formed by a tongue positioned in the barrier wall, the tip of the tongue being sunk into the blow box, and an inclined guide surface which is arranged with its edges around the tongue and which is sunk into the blow box, together with the edges of the guide surface which overlap into the barrier wall.

12 Claims, 10 Drawing Figures

BLOW BOX FOR SUSPENDED GUIDANCE AND/OR CONVEYANCE OF STRIP MATERIAL OR SHEETS

BACKGROUND OF THE INVENTION

1. Field of the Invention

The invention relates to a blow box for suspended guidance and/or conveyance of strip material or sheets. More particularly, the invention is concerned with blow boxes in which the blow means is blown with the effect of the blow jet issuing from a slot nozzle at an incline against the strips or sheets to be guided and/or conveyed.

2. Description of the Prior Art

Blow boxes with slot nozzles are known in various designs. In one known design, the blow box is produced in cast aluminum. In this manner, slot widths can be produced with a high degree of accuracy. However, the high production costs for these cast aluminum boxes are a disadvantage. Therefore, to avoid high production costs the blow boxes are in most cases produced from sheet metal. With the sheet metal blow boxes, it is difficult to maintain a constant slot width over the entire length of the slot. This is difficult even when the nozzle lips are held at a distance by means of bars inserted in the slot. However, not only production tolerances, but also deformations caused in the nozzle lip in operation by the generally hot blow means make it practically impossible to maintain the slot width within narrow tolerances.

There are blow boxes of other types which have blow openings and which aim at producing an area effect such as those disclosed in German Auslegeschrift No. 1,907,083; but, these also are not pertinent to the teachings of the invention, as they do not produce a slot jet, as will be further discussed subsequently.

Narrow tolerances of the slot width are necessary, however, to achieve optimum suspension characteristics. If the strip or sheet, for instance, is guided at a distance of one milimeter from the barrier wall facing the strip or sheet, then according to experience, the accuracy required with a slot width of one millimeter amounts of 0.2 mm. Only when it is possible to guide the strip material absolutely free of contact with the blow box within such a narrow space, can it be guaranteed that strips of material such as paper cannot become deformed in a suspension dryer fitted with such blow boxes due to strain and moisture during drying. Experience with offset dryers, which do not guarantee such a narrow guidance of the strips, has shown that longitudinal waves of about 1 mm high form during drying. These longitudinal waves cause loss in quality of the strips. Attempts have already been made to solve this problem by drying the strip material with hot steam or a combination of hot steam and hot air instead of with dry air. This way of drying has the disadvantage that it comsumes a large amount of energy.

The object of the invention is to produce a blow box for suspended guidance and/or conveyance of strip material or sheets which has the properties of a blow box with slot nozzles and can be produced with a small slot width with a very high degree of accuracy and lower production costs than in previous cases. This object is solved according to the invention with a blow box of the aforementioned type in that blast openings are arranged in the barrier wall facing the strips or sheets so as to be close to one another in a row and have blowing directions which are substantially the same or which slightly diverge towards the ends of the blow box. Each blast opening is formed by a tongue and an inclined guide surface having edges which overlap into the barrier wall. The tongue is positioned in the barrier wall, and the tip of the tongue is sunk or extend inwardly into the blow box. The inclined guide surface is also sunk or extended inwardly into the blow box, and the edges of the guide surface which overlap into the barrier wall and the guide surface are arranged with its edges around the tongue. Such a blow box according to the invention can be produced with the precision of the blow box which is in cast aluminum, and the blow box according to the invention can be produced at a considerably lower cost. The blow box preferably produced by means of a punched-out portion which is cut with a stamp or die and punch. Whereas in the previous blow boxes provided with slot nozzles, several sheet metal parts had to be individually composed to form the blow box, and the spacing elements had to be distributed in the slot to maintain a definite slot width over the length of the slot. The blow box according to the invention is produced from a piece of sheet metal in a single working step.

The jets issuing divergently out of the individual blast openings, which are arranged closely together in a row and form short arc-shaped slots, join to form a solid blow jet and then have the effect of a blow jet issuing from a continuous slot. As the slot blow openings are only short in length, their width can be produced with very high precision. For the same reason, no deformations which change the width of the slot occur in operation when the blow box is heated by the hot blow means. Thus, the basic pre-conditions for a narrow guidance of the strips are achieved. The front edge of strip material is very difficult to guide without contact even with wider distances, and in order to assure that the front edge of the strip material does not come into contact with the tip of the tongue even in the central area of the sunken contact surface, the tip of the tongue is also sunk into the blow box. Due to the structure of the guide surface and its lateral edges, which overlap into the barrier wall, on the one hand and the tongue with its lowered tip on the other, the width of the slot can be made substantially constant over its entire length and with it also the blow jet over its entire width.

Similar blow openings are also known in blow boxes of other types mentioned earlier (German Auslegeschrift No. 1,907,083), but these known blow openings are intended to produce an area effect and not the effect of a slot jet. The blast openings are therefore not arranged in a row in the barrier wall, but are distributed over the entire barrier wall. In contrast to the aforementioned prior known blow box, the blast openings of the blow box according to the invention are constructed so that the tongues are positioned in the surface of the barrier wall. The guide surface is structured in the form of a circular sector and has substantially radially running edges. The angle of opening of the blast openings is between 120° and 180° so that it is more of a broad-fanned swell flow than a jet with a defined direction which issues out of the blast openings. Due to the described features, such blast openings cannot be arranged in a row sufficiently close together positioned to guide a strip spaced at a very narrow distance (e.g. 1 mm) from the barrier wall with the effect of a slot jet so as to be safely without contact.

Optimum suspension properties (in contrast with the aforementioned known blow box) are achieved with a blow box according to the invention in which the lateral edges of the guide surface run substantially parallel. In such a case, the blow jets issue only slightly divergent from the arc-shaped slots so that the adjacent edge jets of the blow jets hardly disturb each other, and the kinetic energy of the blow jets practically completely comes to bear on the strip material; however, the divergence is still sufficient to form a solid slot jet. The blow box according to the invention can be structured in several ways. In one embodiment of the invention, the barrier wall is provided with the blast openings of the type heretofore described according to the teachings of the invention in a pair of rows to direct the blow jets in a direction towards each other.

According to another embodiment, the barrier wall has a perforation or openings for the outlet of additional blow means in front of the row or rows of blast openings. The additional blow means issuing through this perforation serves to prevent the strips or sheets from touching the barrier wall, even in the area of the blow box where no blast openings are provided and the effect of the blow means out of the blast openings is no longer present. According to a further embodiment of the invention, two rows of blast openings are arranged with one row behind the other row and with both rows directing the jet in substantially the same blowing direction. The blast openings of the second row are arranged in staggered relationship to the blast openings of the first row.

In the embodiments with two rows of blast openings lying opposite one another, however, the blowing directions of these openings are preferably directed towards one another.

A blow box particularly suited for stretching the strip or sheet is characterized in that in the case of two rows of blast openings lying opposite one another, the blowing directions of these openings are directed away from one another and the barrier wall has a perforation between the rows for the outlet of additional blow means. In such a case, the blast openings of each row preferably diverge from the center of the blow box towards the end.

As already mentioned, such blow boxes are used in suspension dryers. Blow boxes with rows of blast openings lying opposite one another are above all suited for suspension dryers. The arrangement of the blow boxes in a suspension dryer is preferably above or below the strip material or sheets to be guided and/or conveyed and the upper blow boxes are arranged in staggered relationship with respect to the lower blow boxes. In contrast to the dryers operated with hot steam or with hot steam and hot air combined, in such a dryer, the drying process itself is not affected but longitudinal waves are prevented from forming by guiding the strips at a short distance (approximately 1 mm) from the barrier walls of the blow boxes. Namely, the blow boxes have a pressing effect on the strip material with this short distance.

Other objects, advantages and the nature of the invention will become readily apparent from the detailed description of the preferred embodiments as described in connection with the accompanying drawings.

DESCRIPTION OF THE PREFERRED EMBODIMENTS

Figure 8:
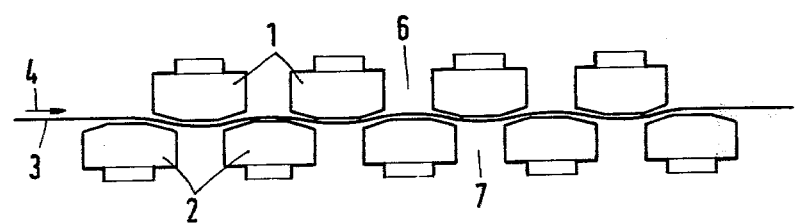
FIG. 8 is a schematic representation of a suspension dryer with a plurality of the blow boxes positioned on opposite sides of the strip of material which is conveyed between the two rows of blow boxes arranged in a staggered relationship facing each other; and, FIG. 9 is an enlarged view of a portion of the suspension dryer of FIG. 8 illustrating perforated metal sheets covering flow-off areas between adjacent blow boxes.
Figure 9:
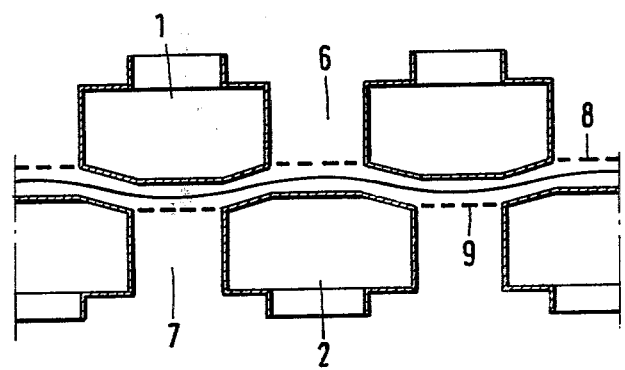

Referring firstly to FIGS. 8 and 9, the suspension dryer includes a set of upper blow boxes 1 positioned on one side of a strip or sheet of moving sheet metal 3 and a set of lower blow boxes 2 positioned on the other side of the strip 3. Each of the blow boxes 1,2 includes a barrier wall 10 (see FIG. 1) which face each other and are directed towards the strip 3. The set of upper blow boxes 1 and lower blow boxes 2 are arranged transversely to the direction in which the strips or sheets 3 run; and the set of lower blow boxes 2 which partly overlap one another of the set of upper blow boxes 1 are arranged in staggered relationship to the blow boxes 1. The strip 3 is guided between the upper and lower blow boxes 1,2 for movement in the direction of arrow 4 at a very narrow distance (1 mm) from the barrier wall of the individual blow boxes 1,2. Between the upper and lower blow boxes 1,2 there are flow-off areas 6,7 which can be covered on the strip side by means of a perforated metal sheet 8,9. Such an embodiment is preferably used to guide metal in strip form which in turn is to be sintered to form sheets. The blow boxes 1,2 can be different or vary in structure.

Figure 1:
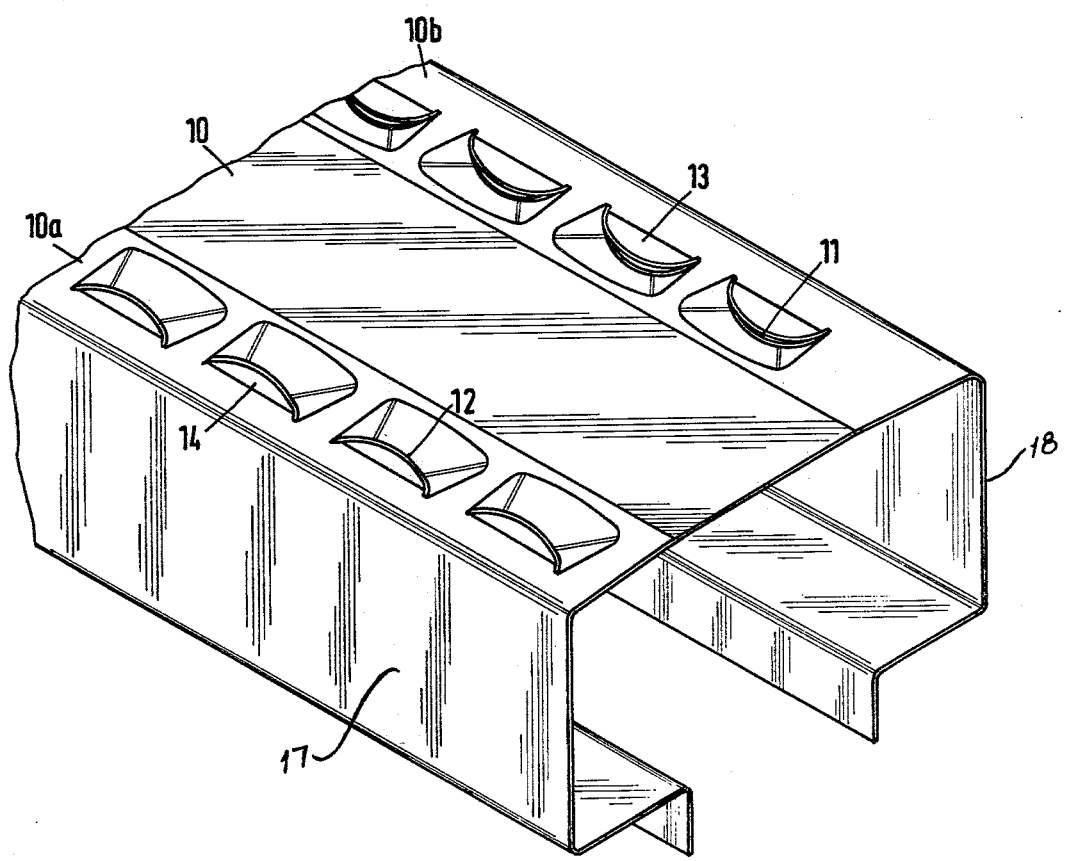
FIG. 1 is an isometric view of a blow box according to the invention with the blast openings arranged to direct the blow jets in a direction towards each other and at an incline towards the strip to be guided.

Referring now more particularly to FIG. 1 which shows in detail one embodiment of a blow box used for blow boxes 1,2 in FIGS. 8 and 9, the blow box has a substantially rectangularly shaped outer configuration with the barrier wall 10 forming one of its wide walls along the axial length of the blow box and having outer edge areas 10a,10b joining the oppositely facing narrow walls 17,18. Each of the outer edge areas 10a,10b has a row of blast openings 11,12 arranged close to one another in its barrier wall 10 which is adapted to face the strip material 3. The blowing direction of the blast openings 11 of one row and the blowing direction of the blast openings of the other row 12 are offset from each other along the axial length of the blow box and are directed at one another so that an air cushion can form between the rows with the aid of tongues 13,14.

Figure 3:
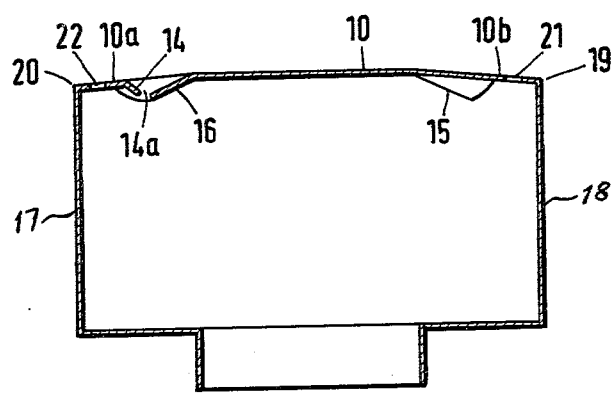
FIG. 3 is a sectional view taken on line I—I of FIG. 2.
Figure 2:
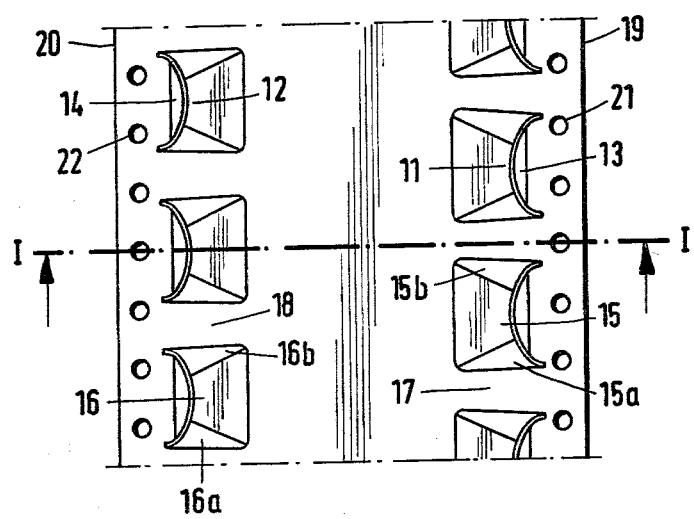
FIG. 2 is a partial top plan view of a modification of the blow box of FIG. 1 with the top barrier wall provided with a perforation or a row of holes positioned in front of the openings of the blast openings to provide an additional blow means which cooperates with the jet issuing from the blast openings.

Referring now more particularly to FIGS. 2 and 3 which illustrates a preferred form of blow box according to the invention, with the same reference numerals used in FIG. 1 to designate corresponding parts, each of the blast openings 11,12 is also formed by an inclined guide surface 15,16 having edge areas or portions 15a,15b, 16a,16b each of which is also sunk into the blow box. The guide surfaces 15,16 overlap into the barrier wall, and these substantially parallel edge areas or portions 15a,15b, 16a,16b run into edge areas 10a,10b of the barrier wall 10. The inclined guide surfaces 15 and 16 together with edge portions 15a,15b and 16a,16b are arranged for positioning around the tongues 13 and 14.

The blast openings are produced by means of a punch cut with stamp, i.e. in one working step. In this way, it is possible to produce the outlet slots of the blast openings with the narrowest tolerances at a low expense.

The blow jets which issue out of the outlet slots as flat individual jets with a jet direction directed towards the center of the blow boxes have the same effect as a continuous blow jet having the same width over its length issuing from a continuous slot. The same effect as a continuous blow jet is produced because of the close arrangement of the outlet slots (only the bars of the barrier wall 10, which are responsible for the firmness of the blow box and are stationary between the individual blast openings 11,12 of the same row separate the individual blast openings 11,12 of the same row from one another). However, this result is achieved because the individual blow jets do not fluctuate in thickness along the length as is the case with a continuous slot of a blow box composed of sheet metal. The ratio of slot width to bar width amounts to approximately 4:1, for example. In such a construction, the slot amounted to approximately 20 mm whereas the bar width was approximately 6 mm.

Outer edge areas 10a and 10b are inclined away from and out of the horizontal plane of barrier wall 10 and terminate in outer bend edges 20,19 respectively, bend edge 20 joins outer edge area 10a with wall 17, and bend edge 19 joins outer edge area 10b with wall 18. In the embodiment according to FIGS. 2 and 3, in contrast to the embodiment of FIG. 1, a row of holes or perforations 21,22 is provided for the supply of additional blow means between the two rows of blast openings 11,12 in each of the outer bend edges 19,20. The perforation 21,22 represents an additional measure by which the strip material 3 is prevented from touching either one of the blow boxes 1 or 2 in the edge areas arranged in front of the blast openings 11,12. The structure of the individual blast openings in the remaining embodiments is the same as the described embodiment. The only difference is their arrangement in the barrier wall and their combination with additional perforations.

Figure 5:
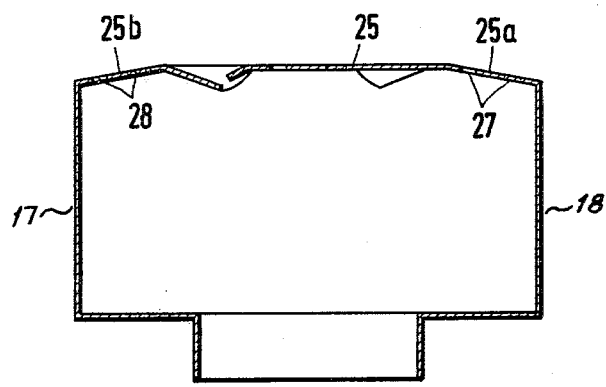
FIG. 5 is a sectional view taken on line II—II of FIG. 4.
Figure 4:
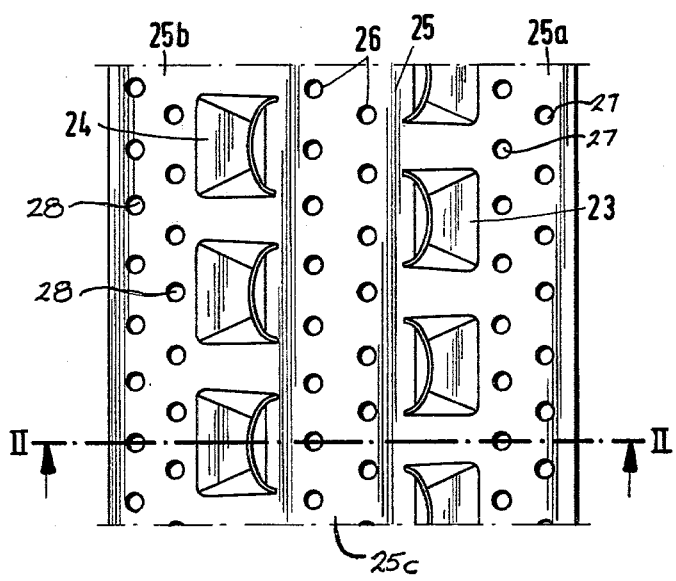
FIG. 4 is a partial top plan view of another modification of the blow box of FIG. 1 with the top barrier wall provided with a perforation or a plurality of rows of holes, some of which are positioned in front of the blast openings as in the FIG. 2 modification and other rows of holes positioned behind and between the blast openings to the rear thereof but aligned with the first-mentioned rows of holes. The blast openings open in a direction to direct the jet issuing therefrom away from each other, but at an incline against the strip to be guided.
Figure 4A:
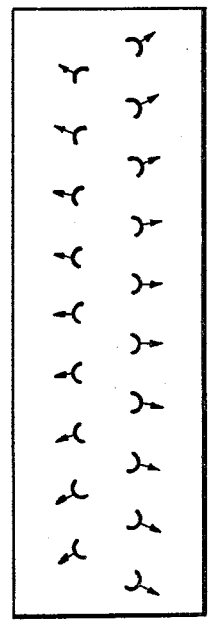
FIG. 4a is a schematic representation of the top of the blow box of FIG. 4 with the directions of blowing indicated by the arrows.

Referring to FIGS. 4, 4a, and 5 which shows another preferred embodiment of the invention with blast openings 23 and 24 similar in construction to blast openings 11 and 12, but differently positioned. Blast openings 23 and 24 while opening away from each other are also staggered along the axial length of the blow box. A barrier wall 25 similar to barrier wall 10 is provided which also includes portions 25a and 25b forming outer inclined edge areas similar to the outer edge areas 10a and 10b. Positioned at the outer edge areas 25a and 25b are a pair of staggered openings or perforations 27 and 28 similar to those provided on outer edge areas 10a and 10b. Barrier 25 includes a center portion 25c positioned between outer edge areas 25a and 25b, and the blast openings 23 and 24 are associated with the center portion 25c which forms the plane central area of the barrier wall 25 and open therethrough.

In the embodiment of FIGS. 4 and 5, the blast openings 23,24 which are arranged in the plane central area of the barrier wall 25 are also slightly bent towards the edges. The blowing directions are, however, directed away from one another, but are, as in the previously described embodiments, directed on an incline against the strip to be guided. A plurality of additional perforations 26 are provided between the two rows of blast air openings 23,24 on the center portion 25c of barrier 25 for the supply of additional blow means. This additional blow means reduces a possible underpressure due to the blow means issuing in opposed directions out of the blast openings 23,24. Moreover, those perforations 27,28 which are arranged in each of the slightly bent edge areas 25a,25b, are useful because it is by means of these perforations that additional blow means is supplied. As can be seen from FIG. 4, the blowing directions of adjacent blast openings 23,24 are not the same as each other, but diverge slightly from the center of the blow box towards the ends of the blow box. The divergence of the blowing directions of adjacent blast openings 23,24 lies, for example, in the range of 1°. A longitudinal pull is practised on the strip material when the blowing direction of the two rows of blast openings 23,24 are directed away from one another and when the blast directions diverge, a transverse pull is exerted on the strip material.

Figure 7:
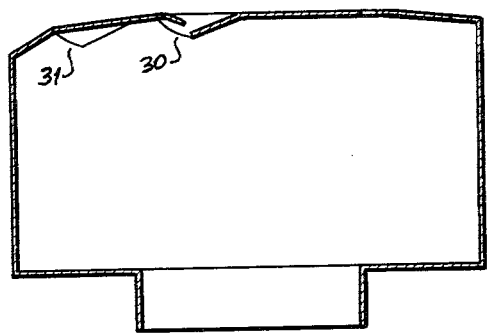
FIG. 7 is a sectional view taken on line III—III of FIG. 6.
Figure 6:
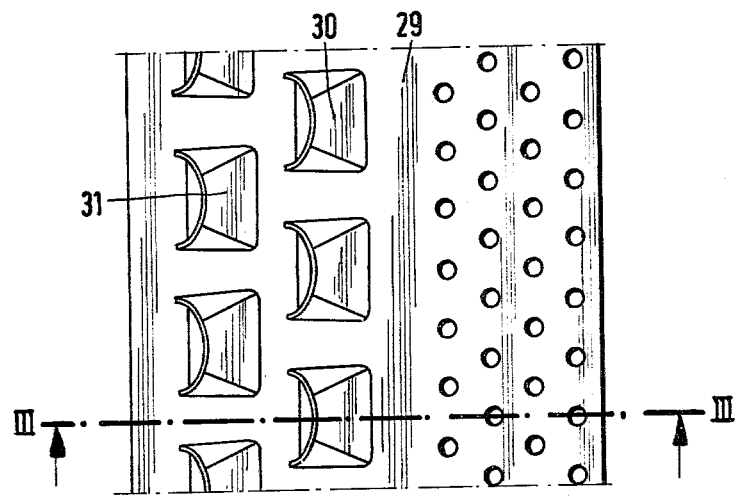
FIG. 6 is a partial top plan view of still another modification of the blow box of FIG. 1. In this embodiment, the blast openings are arranged in adjacent rows, but staggered and with the openings of the blast openings opening towards the same direction to direct the jet issuing therefrom in the same direction towards the strip to be guided. A perforation or row of holes is provided in the barrier wall in front of the blast openings.

Another modification of the blow box is represented in FIGS. 6 and 7, and this blow box, which includes a barrier wall 29, is constructed as a type of carrier surface blow box. Two rows of blast openings 30,31 are provided in the barrier wall 29 with one positioned behind the other and each positioned in the barrier wall 29 facing the strip to be conveyed. The blast openings 30 of one row are staggered in relation to the blast openings 31 of the other row. The main blowing direction of all blast openings 30,31, however, is the same. A plurality of perforations 32 are arranged in the carrier surface area of the barrier wall 29, and by means of these perforations additional blow means is supplied. This blow means prevents the strip or sheet 3 from touching the carrier surface.

A blow jet of constant thickness over the entire length of the blow box is at all events achieved with the blow boxes according to the invention, whether they are constructed as a type of air cushion blow box or as blow box with blowing directions directed away from one another. This enables the strip material 3 as best seen in FIGS. 8 and 9 to be guided at an extremely narrow distance from the barrier wall and a very high degree of reliability against the strip coming into contact with the barrier wall. The guidance at a narrow distance, moreover, is favorable in the drying as the blow boxes then have a pressing effect on the strip or sheet material to be dried so that operation can be carried out with a high drying capacity without there being any danger of the strip or sheet material deforming during drying.

As FIG. 8 shows, the blow boxes can be arranged even with joint overlapping with point blank distance from a conceived central plane between them when their edge areas are slightly bent.

In the various embodiments, different arrangements of blast openings and holes forming the perforation or perforations have been shown, and it will be obvious to those skilled in the art that various changes and modifications may be made within the scope of the disclosure without departing from the scope of the invention. The embodiments disclosed indicate the best mode now known for carrying out the invention.

I claim:

1. A blow box for suspended guidance and/or conveyance of strip material or sheets in which a blow means is blown with the effect of a blow jet issuing from a slot nozzle at an incline against the strip material or sheets to be conveyed, the blow box comprising:
    a barrier wall adapted for placement in facing relationship to the strip material or sheets;
    at least one row of blast openings arranged in said barrier wall so as to be close to one another in the direction of conveyance of the strip material or sheets and facing thereof; and,
    each said blast opening including;
        a tongue positioned in said barrier wall, said tongue having a tip sunk into said blow box;
        an inclined guide surface separate from said tongue sunk into said blow box,
        a pair of edge portions each of which extend into said barrier wall and is connected with said inclined guide surface, and
        said guide surface together with said pair of edge portions being positioned around said tongue inwardly of said barrier wall so that the blow jet issuing from each blast opening diverges towards the ends of the blow box and leaves the blast opening radially.

2. The blow box according to claim 1, wherein said tongue and said guide surface with said pair of edge portions are produced by a punch cut with stamp to provide an opening between said tongue and said guide surface inwardly of said barrier wall.

3. The blow box according to claim 1 or 2, wherein said lateral edge portions run substantially parallel.

4. The blow box according to claim 1 or 2, wherein said barrier wall has a perforation for the outlet of additional blow means in front of said row of blast openings.

5. The blow box according to claim 1, including
    two rows of blast openings arranged one behind the other with substantially the same blowing direction, and
    the blast openings of one of said rows being arranged in a staggered relationship to the blast openings of the other of said rows.

6. The blow box according to claim 5, including
    perforations in said barrier wall in front of and behind said blast openings for the outlet of additional blow means in front of and behind said blast openings.

7. The blow box according to claim 5 or 6, wherein said barrier wall includes
    a center portion and a pair of outer inclined edge areas,
    one row of said blast openings being cut into one of said outer inclined edge areas and the other row of said blast openings being cut into the other of said outer inclined edge areas, whereby to have the blowing direction of the blast openings in said one row slightly diverge from the blowing direction of the blast openings in said other row.

8. The blow box according to claim 1, including
    two rows of blast openings lying opposite one another, with the blowing directions through said blast openings being directed towards one another.

9. The blow box according to claim 1, including
    two rows of blast openings lying opposite one another, with the blowing directions of said blast openings being directed away from one another, and
    a perforation in said barrier wall between said rows for the outlet of additional blow means.

10. A suspension dryer including blow boxes according to claim 1, 2, 8 or 9,
    said blow boxes being arranged above and below the strip material or sheets to be guided and/or conveyed, and said upper blow boxes being arranged in staggered relationship relative to said lower blow boxes.

11. A suspension dryer including blow boxes according to claim 1,
    said blow boxes being arranged in a first row above said strip material or sheets and in a second row below said strip material or sheets,
    said first and said second rows of blow boxes being arranged in a staggered relation relative to each other,
    each two adjacent blow boxes in said first row and in said second row forming a flow-off area, and
    including a perforated sheet covering said flow-off areas.

12. The suspension dryer according to claim 11, wherein the spacing between said strip material or sheets and the barrier walls of said blow boxes is approximately 1 mm.

* * * * *